United States Patent
Dinh et al.

(10) Patent No.: US 10,411,450 B2
(45) Date of Patent: Sep. 10, 2019

(54) PREFABRICATED ELECTRICAL BOX

(71) Applicant: Thomas & Betts International, LLC, Wilmington, DE (US)

(72) Inventors: Cong Thanh Dinh, Collierville, TN (US); Christopher A. Beall, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 1580 days.

(21) Appl. No.: 13/848,559

(22) Filed: Mar. 21, 2013

(65) Prior Publication Data

US 2013/0248243 A1    Sep. 26, 2013

Related U.S. Application Data

(60) Provisional application No. 61/613,779, filed on Mar. 21, 2012.

(51) Int. Cl.
*H02G 3/14* (2006.01)
*H02G 1/00* (2006.01)
*H02G 3/08* (2006.01)

(52) U.S. Cl.
CPC ............. *H02G 3/14* (2013.01); *H02G 1/00* (2013.01); *H02G 3/081* (2013.01); *H02G 3/086* (2013.01); *Y10T 29/49002* (2015.01)

(58) Field of Classification Search
CPC ............ H02G 3/14; H02G 1/00; H02G 3/081; H02G 3/086
USPC ............................................. 174/535, 50, 58
See application file for complete search history.

(56) References Cited

U.S. PATENT DOCUMENTS

| | | | | |
|---|---|---|---|---|
| 2,769,151 A | * | 10/1956 | Salomone | H02G 5/08 174/138 F |
| 3,324,234 A | * | 6/1967 | Hervig | H01R 4/00 174/135 |
| 3,909,050 A | * | 9/1975 | Vicendese | E05B 65/0014 292/128 |
| 4,660,912 A | | 4/1987 | Tomek | |
| 4,809,875 A | | 3/1989 | Takano | |
| 4,979,634 A | | 12/1990 | Begley | |
| 4,993,963 A | | 2/1991 | Pedigo | |
| 5,065,878 A | * | 11/1991 | Altmann | H02B 1/28 220/3.8 |
| 5,106,326 A | | 4/1992 | Tsuji et al. | |
| 5,124,506 A | | 6/1992 | Briggs et al. | |
| 5,257,946 A | | 11/1993 | MacMillan et al. | |
| 5,480,053 A | * | 1/1996 | Jorgensen | H02G 3/081 220/3.9 |
| 5,518,334 A | | 5/1996 | Yagi et al. | |
| D381,631 S | | 7/1997 | Hallett et al. | |
| 5,646,371 A | * | 7/1997 | Fabian | H02G 3/123 174/58 |
| 5,904,260 A | | 5/1999 | Bauer et al. | |
| 6,127,630 A | | 10/2000 | McKenzie et al. | |
| 6,184,468 B1 | * | 2/2001 | Speziale | H02G 3/14 174/66 |
| 6,649,838 B1 | | 11/2003 | Lopez, Sr. et al. | |

(Continued)

*Primary Examiner* — Dhiru R Patel
(74) *Attorney, Agent, or Firm* — Taft Stettinius & Hollister LLP; J. Bruce Schelkopf (57) ABSTRACT

An improved electrical box is disclosed that incorporates a bracket and device cover as a single combined unit. The combined unit is simpler to manufacture and to install as opposed to three separate pieces.

13 Claims, 6 Drawing Sheets

(56) References Cited

U.S. PATENT DOCUMENTS

| | | | |
|---|---|---|---|
| 6,796,814 B1 | 9/2004 | Handschke | |
| 6,838,616 B2 | 1/2005 | Harrison et al. | |
| 6,875,922 B1 * | 4/2005 | Petak | H02G 3/123 |
| | | | 174/57 |
| 7,109,414 B2 | 9/2006 | Reynolds | |
| 7,126,058 B2 | 10/2006 | Herth | |
| 7,396,996 B1 * | 7/2008 | Shotey | H02G 3/14 |
| | | | 174/481 |
| 7,598,452 B1 | 10/2009 | Shotey et al. | |
| 7,709,136 B2 * | 5/2010 | Touchton | H01M 2/30 |
| | | | 429/100 |
| 7,799,993 B2 | 9/2010 | Drane et al. | |
| 7,989,699 B1 * | 8/2011 | Shotey | H02G 3/14 |
| | | | 174/50 |
| 8,587,744 B2 * | 11/2013 | Shin | G02F 1/133308 |
| | | | 349/58 |
| 8,680,394 B2 * | 3/2014 | Korcz | H02G 3/20 |
| | | | 174/58 |
| 2006/0108362 A1 * | 5/2006 | Lalancette | H02G 3/126 |
| | | | 220/3.7 |
| 2009/0173512 A1 | 7/2009 | Elberson | |
| 2010/0108374 A1 * | 5/2010 | Korcz | H02B 1/52 |
| | | | 174/520 |

* cited by examiner

PREFABRICATED ELECTRICAL BOX

FIELD OF THE INVENTION

The present invention is generally directed toward an electrical box for housing electrical connections.

BACKGROUND OF THE INVENTION

Installation of a steel electrical box that is typically used in commercial installations requires mounting of three separate parts: first a mounting bracket is mounted to a stud, then an electrical box is mounted to the bracket, and, after the electrical connections are made within the box, a device cover (also known as a mud ring) is mounted to the electrical box.

SUMMARY OF THE INVENTION

We disclose herein an electrical box that incorporates a bracket and device cover into a single combined unit. The combined unit is simpler to both manufacture and to install as compared to three separate pieces.

The electrical housing assembly comprises an electrical box having mounting brackets extending from the sides of the electrical box, a device cover for receiving an electrical component, and a living hinge that allows the device cover to rotate about the hinge between open and closed positions.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1A:
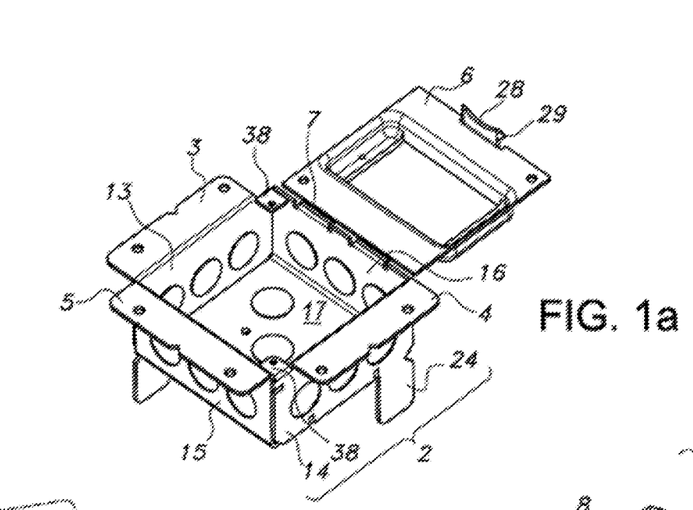
FIG. 1a depicts a perspective view of the electrical housing assembly from above with the device cover in an open position.
Figure 1B:
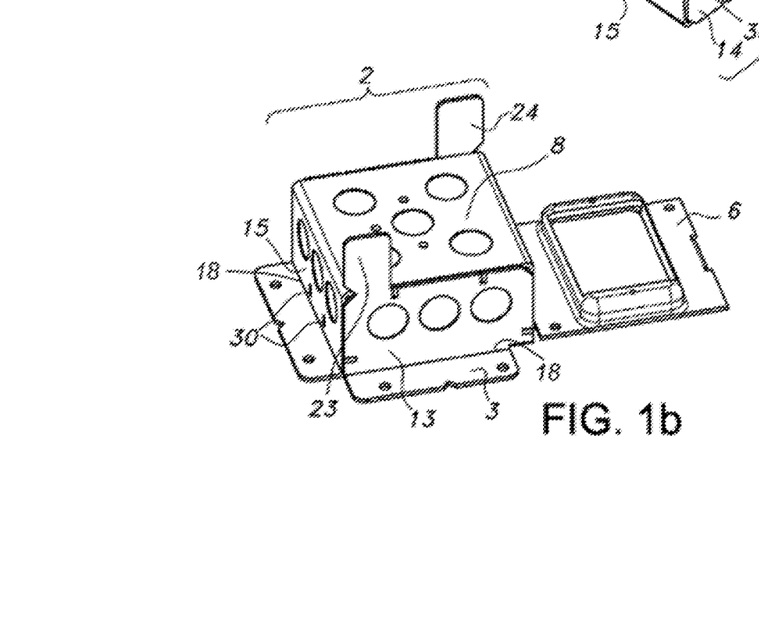
FIG. 1b depicts a perspective view of the electrical housing assembly from below with the device cover in the open position.
Figure 1C:
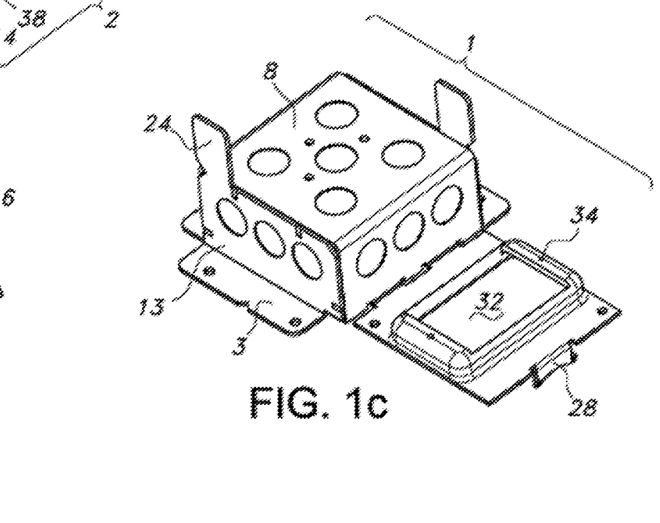
FIG. 1c depicts a perspective view of the electrical housing assembly from below with the device cover in the open position.
Figure 2A:
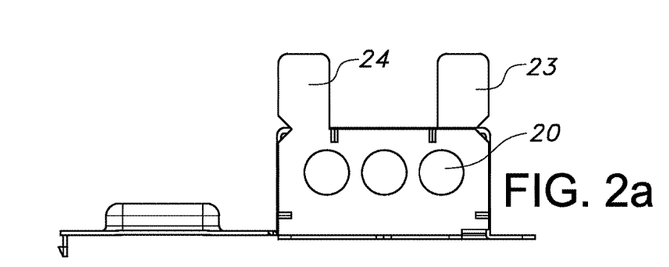
FIG. 2 depicts elevation views of the electrical box from (a) bottom side; (b) right side; (c) front; (d) left side; and (e) top side.
Figure 2B:
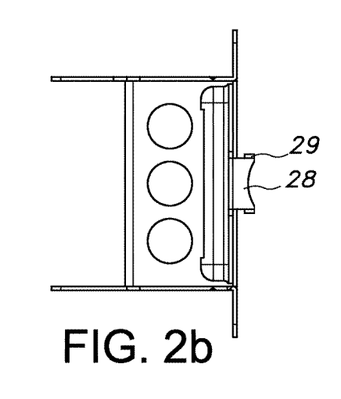
Figure 2C:
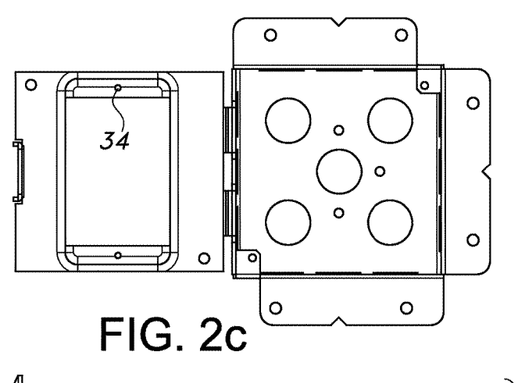
Figure 2D:
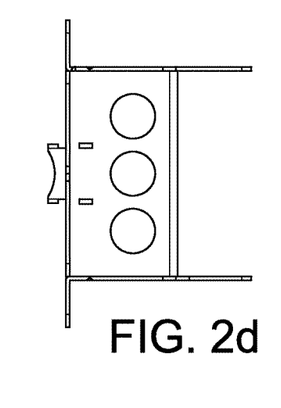
Figure 2E:
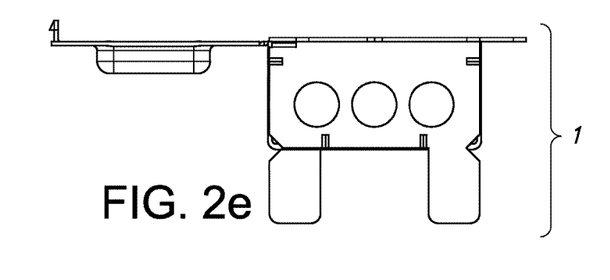

Referring to the drawings, FIGS. 1a-c. illustrate an exemplary embodiment of the electrical housing assembly 1. The electrical housing assembly 1 is designed to be affixed behind a finished surface, such as a wall or ceiling such that the electrical device mounted to the electrical housing assembly 1 protrudes through the finished surface. As will be appreciated from the figure, the electrical housing assembly 1 is comprised of an electrical box 2 with built-in mounting brackets, and a device cover 6 attached to electrical box 2 using a living hinge 7.

Electrical box 2 resembles existing electrical boxes in that the electrical box 2 has a rear surface 8 and sidewalls 13-16, and an opening 17 at the front through which electrical connections can be accessed and inspected. The electrical housing assembly 1 is installed during construction such that the opening 17 of electrical box 2 faces the installer, and the rear surface 8 is farthest from the finished surface behind which the electrical housing assembly 1 is installed. As viewed in FIG. 1a, right sidewall 16 is directly attached by living hinge 7 to device cover 6; left sidewall 15 forms the opposite side of electrical box 2 from right sidewall 16. Top sidewall 13 and bottom sidewall 14 form the upper and lower sides, respectively, of electrical box 2. It should be appreciated that these descriptive names are for the sake of clarity in this disclosure and that the electrical housing assembly 1 may be oriented in any direction during installation.

Unlike prior art electrical boxes which require a separate mounting bracket, the presently disclosed electrical housing assembly 1 incorporates mounting brackets along the edges 18 of the electrical box 2. Vertical mounting bracket 5 is a flange attached to the front of left sidewall 15 such that it is substantially coplanar with the front of electrical housing assembly 1. Vertical mounting bracket 5 allows the electrical housing assembly 1 to be mounted to a vertical stud when installed in a wall such that left sidewall 15 is in contact with the vertical stud. Horizontal mounting brackets 3 and 4 are flanges that are perpendicular to the top sidewall 13 and bottom sidewall 14, respectively, and that allow the electrical housing assembly 1 to be mounted to a beam along either of these surfaces. Vertical mounting bracket 5 and horizontal mounting brackets 3 and 4 have holes through their front surfaces through which a fastener, such as a nail or screw, may be driven in order to securely fasten the mounting bracket to a stud or other support.

Top sidewall 13 extends beyond the rear surface 8 to form top far side support 23. This top far side support 23 helps ensure that the installer does not inadvertently push the electrical housing assembly 1 too far beyond the finished surface of the wall cavity in which the electrical housing assembly 1 is to installed, as doing so can cause the electrical housing assembly 1 to fall behind the wall. The top far side support 23 will come into contact with the back surface of the wall on the other side of the wall cavity if pushed too far. The top far side support 23 may additionally ensure that electrical housing assembly 1 does not move or become dislodged from its installed position. It should be appreciated that top far side support 23 may be notched to facilitate bending so that it can be moved out of the way, or to provide greater support as required by the installation.

Bottom sidewall 14 extends beyond the rear surface 8 to form bottom far side support 24. As in the case of the top far side support, 23 this bottom far side support 24 also helps ensure that the installer does not inadvertently push the box too far into the wall cavity. The bottom far side support 24 will also come into contact with the back surface of the wall on the other side of the wall cavity if pushed too far. Bottom far side support 24 my also ensure that electrical housing assembly 1 does not become dislodged from its installed position. It should be appreciated that bottom far side support 24 may also be notched to facilitate bending so that it can be moved out of the way, or to provide greater support as required by the installation.

Rear surface 8 and the sidewalls of electrical box 2 also have knockouts 20 located in their surfaces. The knockouts 20 are portions of material that may be removed by applying force against their surface. The knockouts 20 are made by cutting away most of a circular portion of material at all but a weak attachment point. The removal of a knockout 20 creates a hole in the surface through which wiring may pass through.

Device cover 6 is configured to keep debris, such as sheetrock dust, plaster, and mudding compound out of the electrical box 2. Device cover 6 is attached at to right sidewall 16 by living hinge 7. Living hinge 7 is a weakened portion of material that allows device cover 6 to bend along the axis formed at the intersection of right sidewall 16 and device cover 6. Living hinge 7 may be formed by removal of material at the intersection of right sidewall 16 and device cover 6 as depicted in the figures. Preferably, living hinge 7 is also scored to ensure that the device cover 6 bends at the intended location.

Figure 3A:
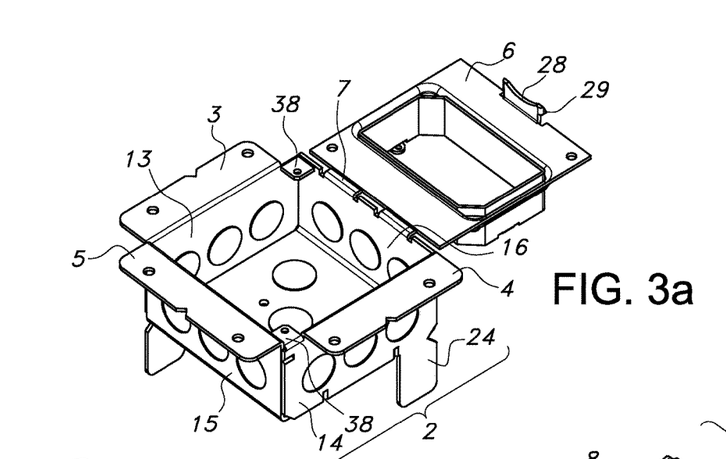
FIG. 3a depicts a perspective view of another embodiment of the electrical housing assembly from above with the device cover in an open position.
Figure 3B:
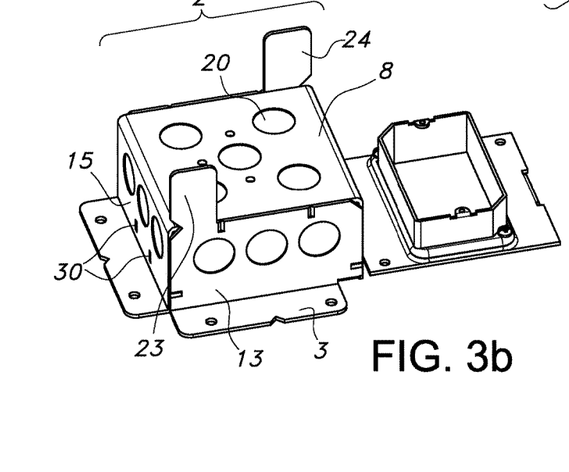
FIG. 3b depicts a perspective view of another embodiment of the electrical housing assembly from below with the device cover in the open position.
Figure 3C:
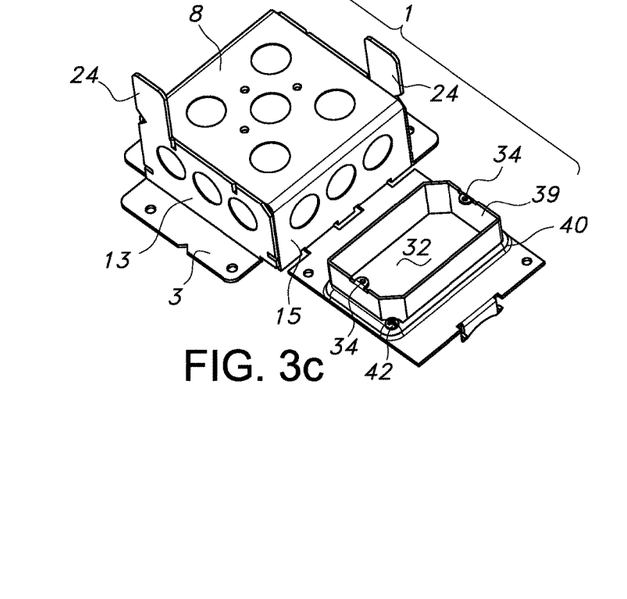
FIG. 3c depicts a perspective view of another embodiment of the electrical housing assembly from below with the device cover in the open position.
Figure 5:
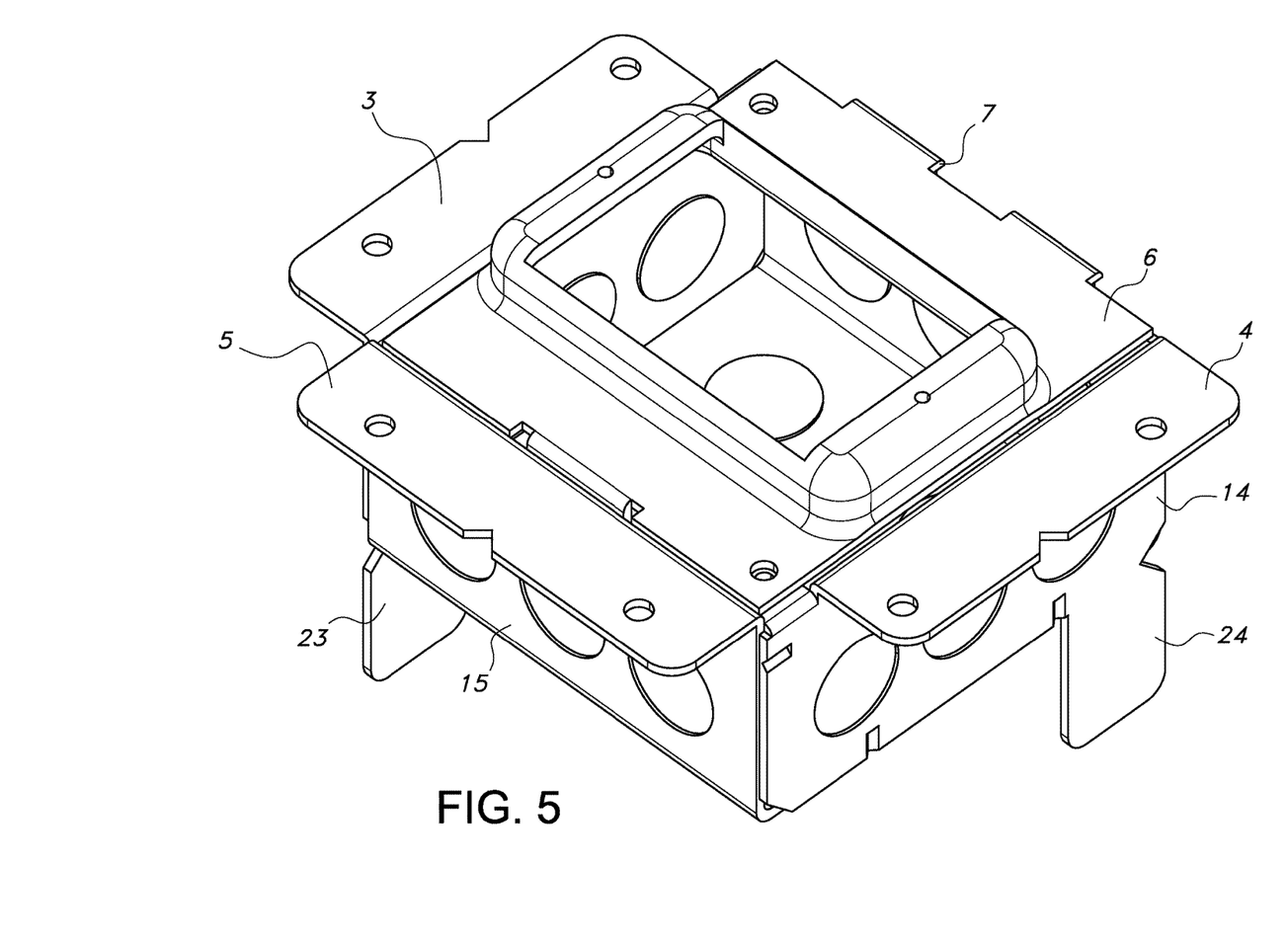
FIG. 5 depicts a perspective view of the electrical housing assembly from above with the device cover in the closed position.

Device cover 6 can be in an open position as depicted in FIG. 1 and FIG. 3, or it may be in a closed position, as depicted in FIG. 5. Various methods may be employed to secure device cover 6 in the closed position. In one embodiment, as depicted in FIG. 2, locking tab 28 extends almost perpendicularly from device cover 6 and further comprises locking tab protrusions 29, which are small protrusions on locking tab 28 that extend away from living hinge 7. Snap-in holes 30 are holes located in left sidewall 15 are that configured to act as a catch and engage with locking tab protrusions 29. As device cover 6 is moved into the closed position, locking tab 28 slightly deforms toward the direction of living hinge 7 as locking tab protrusions 29 slide against left sidewall 15. When locking tab protrusions 29 encounter snap-in holes 30, the locking tab protrusions 29 engage with snap in holes 30, thus releasing the spring force caused by deformation of the locking tab 28. With the locking tab protrusions 29 engaged with snap-in holes 30, the device cover 6 is secured in the closed position.

Device cover 6 has an opening 32 through which an electrical component, such as a light switch or outlet, may be installed. In one embodiment, the electrical component will attach directly to the device cover 6 using mounting holes 34 so that a portion of the electrical component will pass through opening 32.

As will be appreciated from FIG. 3, in another embodiment, an adjustable device cover with an extension sleeve may be used to accommodate various thicknesses of the finished surface behind which electrical housing assembly 1 is to be installed, as further described in U.S. Pat. No. 7,495,170 to Dinh et al. In this embodiment, extension sleeve 39 is secured in place by collar 40. To adjust for thicker walls, the collar locking screws 42 are first loosened, and the extension sleeve 39 is extended to the desired length. Then locking screws 42 are tightened to prevent further movement of extension sleeve 39.

It is anticipated that the device cover 6 will only be moved between open and closed positions a few times. Repeated opening and closing of the device cover 6 can result in metal fatigue and eventual separation of the device cover 6 from the electrical housing. In such event, the device cover 6 can be used as a standard cover of the prior art by affixing it to electrical box 2. In one embodiment, it is affixed using screws to cover attachment tabs 38. The cover attachment tabs 38 are tabs extending perpendicularly from sides of electrical box 2, and which have a threaded hole for receiving the screw. The threaded hole corresponds to holes in device cover 6, through which the screw is placed. Alternatively, if desired, a different device cover 6 may be used in place of the one attached to electrical housing assembly 1 by removing device cover 6 and affixing the replacement cover to cover attachment tabs 38 using screws.

Figure 6A:
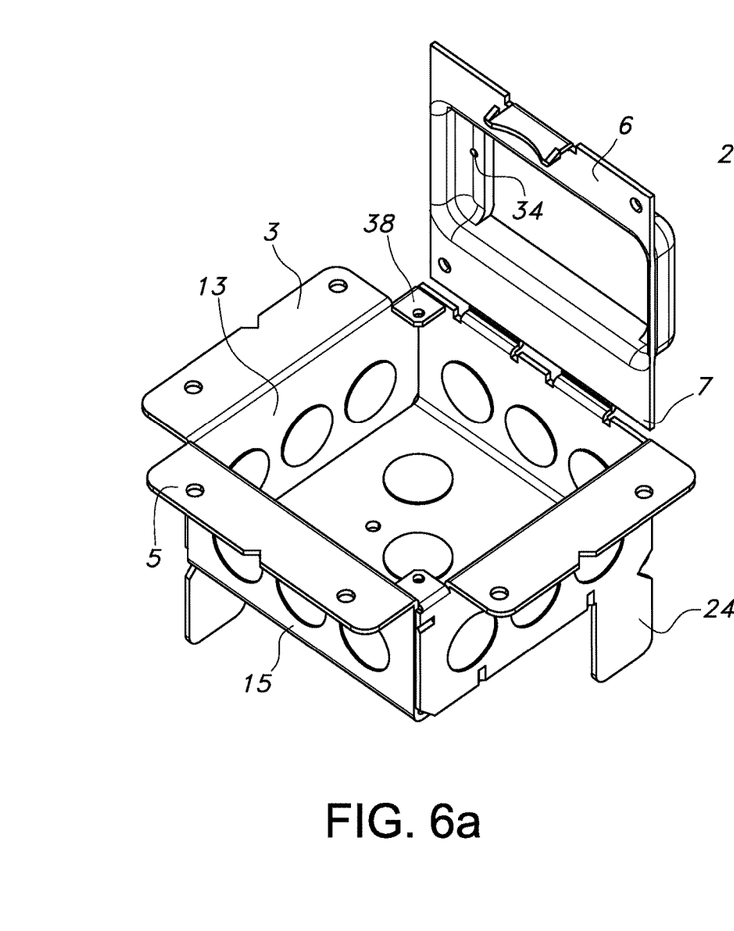
FIG. 6a depicts a perspective view from above of an embodiment of the electrical housing assembly with a device cover in a partially closed position.
Figure 6B:
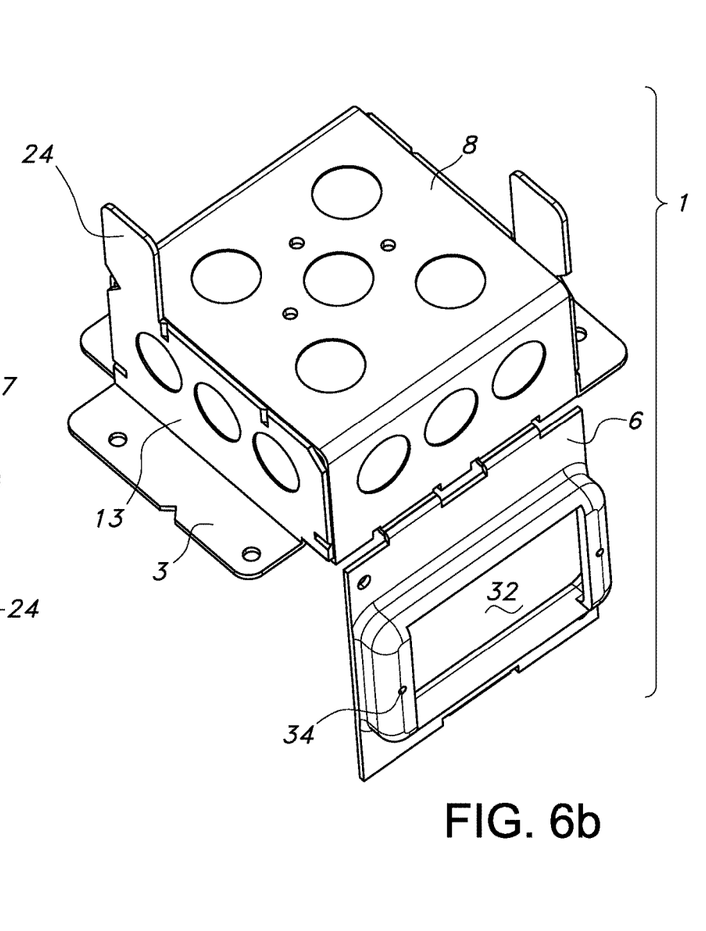
FIG. 6b depicts a perspective view from below of an embodiment of the electrical housing assembly with a device cover in a partially closed position.

In one embodiment, the device cover 6 for the electrical housing assembly is bent into a partially closed position at the time of manufacture so that it is easier for an installer to bend at the living hinge 7. Because the device cover 6 is already bent along living hinge 7, it reduces the risk that the installer will bend the device cover 6 toward the electrical box 2 at another location other than at the living hinge 7.

Figure 4:
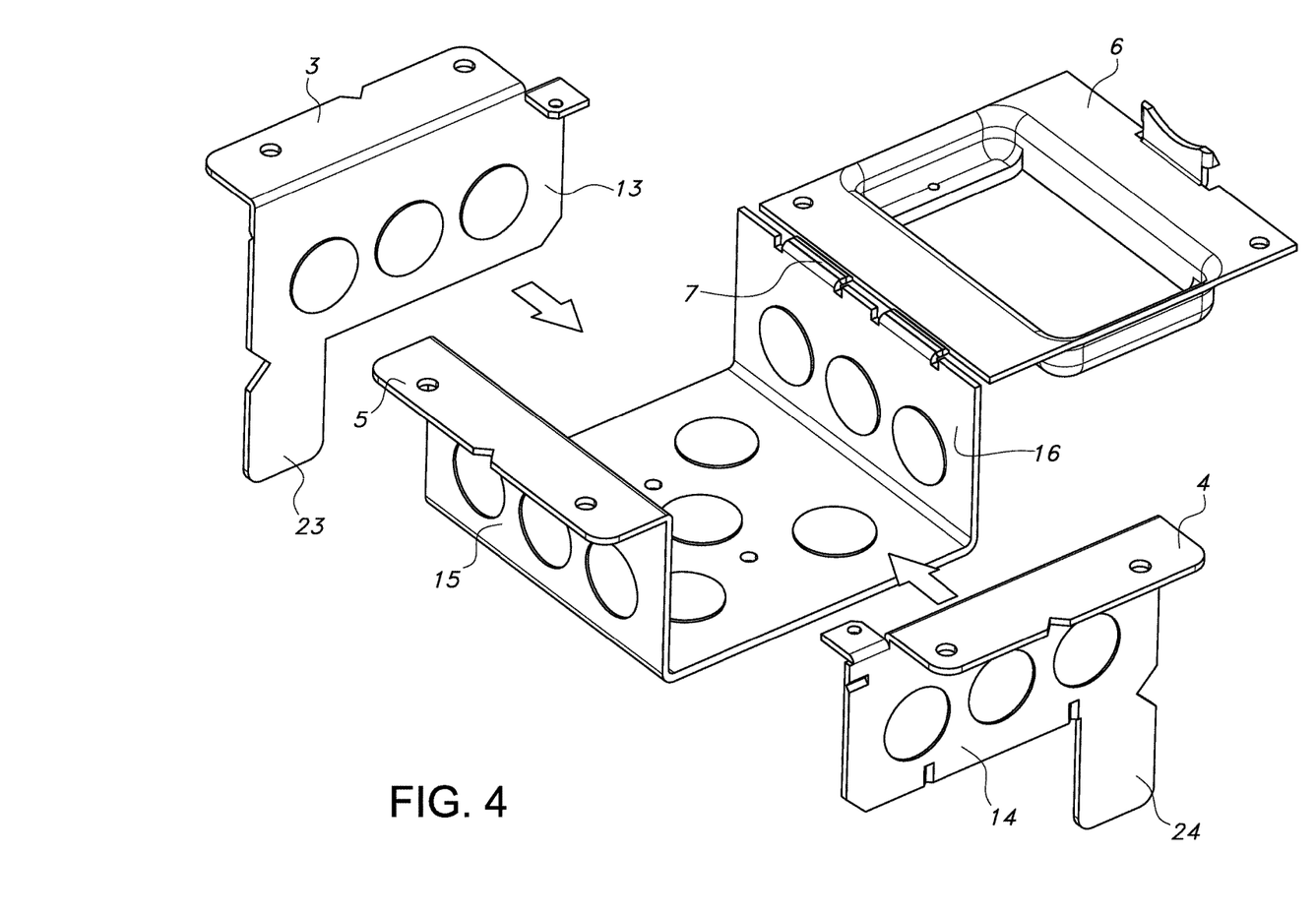
FIG. 4 depicts a diagram showing one method of assembly of the electrical housing assembly.

It should be appreciated that the disclosed electrical housing assembly 1 is easier to manufacture and install compared to separate components. Electrical housing assembly 1 can be manufactured from stamped sheet metal that preferably meets UL listing which currently requires $1/16^{th}$ inch thick (0.063 inches) sheet metal. It can be made from a single piece of metal, but in order to reduce waste, it is preferably formed using a couple of pieces welded together. In one embodiment, a first piece is formed from sheet metal that includes the vertical mounting bracket 5, left sidewall 15, rear surface 8, right sidewall 16, living hinge 7, and device cover 6. A second piece is formed from sheet metal that includes top sidewall 13, horizontal mounting bracket 3, top far side support 23, and cover attachment tab 38. It should be appreciated that by flipping another of this second piece over, it may be used as bottom sidewall 14, horizontal mounting bracket 4, bottom far side support 24, and cover attachment tab 38. Thus, only two metal forms are required in this method of making the electrical box. The three pieces shown in FIG. 4 are then welded together to form electrical housing assembly 1.

It should be appreciated that combining the electrical box, bracket, and device cover in to a single unit offers advantages over using separate pieces. In previous electrical box assemblies, the electrical box bolts to bracket. When the screw is loosened to access the electrical box, the screw, box, cover, or bracket can fall into the wall cavity. With the presently disclosed design, there is no chance of any of these components falling into the wall cavity. Additionally, the installer only has to carry one unit, and installation speed is significantly quicker than using multiple components.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. An electrical housing assembly comprising:
   a. an electrical box having a plurality of sidewalls and a rear surface, the plurality of sidewalls having an upper edge that defines an opening into the electrical box;
   b. a mounting bracket outwardly extending from the upper edge of each of at least a first sidewall and a second sidewall of the plurality of sidewalls of the electrical box, the mounting bracket being integrally formed with the first sidewall and the second sidewall, the mounting bracket for each of the first and second sidewalls extending along approximately the entire length of the upper edge; and
   c. a device cover having a generally flat surface containing a cover opening configured to receive an electrical component, the device cover further including mounting holes for affixing the electrical component to the device cover, the device cover being integrally formed with a third sidewall of the plurality of sidewalls, wherein the device cover is attached to the third sidewall by a living hinge that accommodates pivotal displacement of the device cover relative to the third sidewall from an open position to a closed position, the device cover configured to cover a portion of the opening of the electrical box when the devivbce cover is in the closed position, the living hinge comprising a weakened portion of material that adjoins the device cover to the third sidewall that accommodates pivotal displacement of the device cover along an axis formed at an intersection of the third sidewall and the device cover.

2. The electrical housing assembly of claim 1, wherein the mounting bracket outwardly extends perpendicularly from the upper edge of the first sidewall of the electrical box.

3. The electrical housing assembly of claim 1, wherein a tab extends from at least one sidewall of the plurality of sidewalls and beyond the rear surface to form a far side support.

4. The electrical housing assembly of claim 3, wherein the far side support includes a notch to facilitate bending of the far side support.

5. The electrical housing assembly of claim 1, wherein the electrical housing assembly is made from a single piece of stamped metal and remains one integral piece upon assembly.

6. The electrical housing assembly of claim 1, wherein the electrical housing assembly is constructed from:
   a first piece of metal comprising the mounting bracket, the rear surface, the first sidewall, and the third sidewall of the plurality of sidewalls, the living hinge, and the device cover, the first sidewall and the third sidewall being on opposing sides of the electrical box;
   a second piece of metal comprising the second sidewall of the plurality of sidewalls; and
   a third piece of metal comprising a fourth sidewall of the plurality of sidewalls, the second and fourth sidewalls being on opposing sides of the electrical box.

7. The electrical housing assembly of claim 6, wherein the second piece of metal and the third piece of metal are identical.

8. The electrical housing assembly of claim 1, further comprising a retention mechanism for keeping the device cover in the closed position.

9. The electrical housing assembly of claim 8, wherein the retention mechanism comprises a locking tab extending from the device cover and a corresponding catch on the electrical box configured to receive the locking tab.

10. The electrical housing assembly of claim 1, further comprising knockouts located on at least the rear surface of the electrical box for removal of an area of the electrical box for the passage of wires.

11. The electrical housing assembly of claim 1, further comprising a hole configured to allow the passage of a threaded portion of a screw in the device cover and a corresponding cover attachment screw holes on the electrical box for receiving the threaded portion of the screw.

12. The electrical housing assembly of claim 1, wherein the device cover includes an extendable sleeve that is configured for selective linear extension relative to at least other portions of the device cover to accommodate thicker walls.

13. The electrical housing assembly of claim 1, wherein the plurality of sidewalk further includes a fourth sidewall, and wherein the mounting bracket outwardly extends from the upper edge of each of the first, second, and fourth sidewalk.

* * * * *